(12) United States Patent
Hong et al.

(10) Patent No.: US 9,287,559 B2
(45) Date of Patent: Mar. 15, 2016

(54) LITHIUM SECONDARY BATTERY

(71) Applicant: LG Chem, Ltd., Seoul (KR)

(72) Inventors: Yeon Suk Hong, Daejeon (KR); Jae Seung Oh, Daejeon (KR); Hyo Jin Lee, Daejeon (KR); Byoung Bae Lee, Daejeon (KR); You Jin Shim, Daejeon (KR)

(73) Assignee: LG Chem, Ltd. (KR)

( * ) Notice: Subject to any disclaimer, the term of this patent is extended or adjusted under 35 U.S.C. 154(b) by 189 days.

(21) Appl. No.: 14/026,020

(22) Filed: Sep. 13, 2013

(65) Prior Publication Data

US 2014/0030588 A1 Jan. 30, 2014

Related U.S. Application Data

(63) Continuation of application No. PCT/KR2013/004829, filed on May 31, 2013.

(30) Foreign Application Priority Data

May 31, 2012 (KR) .................. 10-2012-0058783

(51) Int. Cl.
| | | |
|---|---|---|
| *H01M 4/36* | (2006.01) | |
| *H01M 4/525* | (2010.01) | |
| *H01M 10/0568* | (2010.01) | |
| *H01M 10/42* | (2006.01) | |
| *H01M 4/131* | (2010.01) | |
| *H01M 4/485* | (2010.01) | |
| *H01M 4/505* | (2010.01) | |
| *H01M 10/0567* | (2010.01) | |
| *H01M 4/02* | (2006.01) | |

(52) U.S. Cl.
CPC .............. *H01M 4/366* (2013.01); *H01M 4/131* (2013.01); *H01M 4/485* (2013.01); *H01M 4/505* (2013.01); *H01M 4/525* (2013.01); *H01M 10/0567* (2013.01); *H01M 10/0568* (2013.01); *H01M 10/4235* (2013.01); *H01M 2004/021* (2013.01); *H01M 2004/028* (2013.01); *Y02E 60/122* (2013.01)

(58) Field of Classification Search
CPC .............................. H01M 10/052; H01M 4/36
See application file for complete search history.

(56) References Cited

U.S. PATENT DOCUMENTS

| | | | | |
|---|---|---|---|---|
| 2002/0031710 A1* | 3/2002 | Kezuka | ............. | H01M 10/0565 429/303 |
| 2003/0029333 A1 | 2/2003 | Sato et al. | | |
| 2006/0216601 A1* | 9/2006 | Komiyama et al. | ........ | 429/231.1 |
| 2008/0038645 A1 | 2/2008 | Kolosnitsyn et al. | | |
| 2010/0015521 A1 | 1/2010 | Kim | | |
| 2011/0129722 A1* | 6/2011 | Yoneda | .................. | H01M 4/661 429/162 |
| 2012/0070708 A1 | 3/2012 | Ohira et al. | | |
| 2012/0219840 A1* | 8/2012 | Choi et al. | ..................... | 429/136 |
| 2012/0308881 A1* | 12/2012 | Tokuda | ............. | H01M 10/0567 429/199 |
| 2013/0157116 A1 | 6/2013 | Hong et al. | | |

FOREIGN PATENT DOCUMENTS

| | | | |
|---|---|---|---|
| CN | 1325147 | A | 12/2001 |
| EP | 2405510 | A2 | 1/2012 |
| JP | 2003-187863 | A | 7/2003 |
| JP | 2004-022379 | A | 1/2004 |
| JP | 2007-149656 | A | 6/2007 |
| JP | 2010500709 | A | 1/2010 |
| JP | 2011146132 | A | 7/2011 |
| KR | 20020080265 | A | 10/2002 |
| KR | 20070109854 | A | 11/2007 |
| KR | 20090127589 | A | 12/2009 |
| KR | 20100005416 | A | 1/2010 |
| KR | 2012-0016019 | A | 2/2012 |
| KR | 20120042758 | A | 5/2012 |
| WO | WO2010101395 | * | 9/2010 |

OTHER PUBLICATIONS

KR1020080053643MT.*
International Search Report from PCT/KR2013/004829, dated Aug. 13, 2013.
Office Action from corresponding Chinese Application No. 201380003681.0, dated Aug. 5, 2015.

* cited by examiner

*Primary Examiner* — Patrick Ryan
*Assistant Examiner* — Alex Usyatinsky
(74) *Attorney, Agent, or Firm* — Lerner, David, Littenberg, Krumholz & Mentlik, LLP

(57) ABSTRACT

A lithium secondary battery comprising a positive electrode, a negative electrode, a separator inserted between the positive electrode and the negative electrode and a non-aqueous electrolyte is provided. The positive electrode comprises a first positive electrode active material represented by following Chemical Formula 1. And the non-aqueous electrolyte comprises a first lithium salt, a second lithium salt represented by following Chemical Formula 2 and a non-aqueous organic solvent.

$$Li_xM_yO_z \qquad \text{[Chemical Formula 1]}$$

$$Li^+RCOO^- \qquad \text{[Chemical Formula 2]}$$

(In Chemical Formulae 1 and 2, $M=Ni_aMn_bCo_c$, in which $0<a<2$, $0<b<2$, $0<c<2$, $a+b+c=1$ or 2, $0.5 \le x \le 1.3$, $1<x+y \le 3.3$, $2 \le z \le 4$, and R is independently a $C_1$-$C_{10}$ alkyl group, a $C_6$-$C_{12}$ aryl group, a $C_2$-$C_5$ alkenyl group, a halogen substituted $C_1$-$C_{10}$ alkyl group, a halogen substituted $C_6$-$C_{12}$ aryl group or a halogen substituted $C_2$-$C_5$ alkenyl group).

21 Claims, 2 Drawing Sheets

LITHIUM SECONDARY BATTERY

CROSS-REFERENCE TO RELATED APPLICATIONS

This application is a continuation of International Application No. PCT/KR2013/004829 filed on May 31, 2013, which claims priority from Korean Patent Application No. 10-2012-0058783 filed with Korean Intellectual Property Office on May 31, 2012, the entire contents of which are incorporated herein by reference.

BACKGROUND OF THE INVENTION

1. Field of the Invention

The present invention relates to a lithium secondary battery comprising a positive electrode, a negative electrode, a non-aqueous electrolyte comprising a non-aqueous organic solvent and a lithium salt, and more particularly to a lithium secondary battery comprising a positive electrode comprising a positive electrode active material of a three-component system and a non-aqueous electrolyte comprising an additive for deactivating a transition metal comprised in the positive electrode active material, thereby improving a cycle lifetime and preventing the lithium secondary battery from swelling phenomenon.

2. Description of the Related Art

Recently, as the application field of an energy storage technique is enlarged to a cellular phone, a camcorder, a notebook PC along with an electric vehicle, researches on the high energy densification of a battery employed as an electric power source of electronic devices have been actively conducted.

A lithium secondary battery developed during the early 1990s comprises a negative electrode made by using a carbon material capable of absorbing and desorbing lithium ions, a positive electrode made by using a positive electrode active material and a non-aqueous electrolyte comprising a lithium salt dissolved in a mixed organic solvent.

Recently, as the utilizing range of the lithium secondary battery is enlarged, requirement on lithium secondary batteries maintaining good properties at a severe environment comprising a high temperature and a low temperature, and capable of stable charging at a high voltage is gradually increasing.

Meanwhile, the capacity of the positive electrode active materials may be increased as a charging potential increases, however, the desorbing of the transition metal oxides constituting the positive electrode active material also may be accelerated to induce a structural instability.

In addition, organic solvents used as the non-aqueous electrolyte of the lithium secondary battery such as ethylene carbonate, propylene carbonate, dimethoxy ethane, γ-butyrolactone, N,N-dimethyl formamide, tetrahydrofuran or acetonitrile may be oxidized by emitted transition metal oxides and generate a gas when stored at a high temperature for a long time. Due to the generated gas, a battery assembly (battery parts) may be deformed to induce an internal short, and the battery may be deteriorated. In severe cases, the battery may be ignited or exploded. The oxidation reaction of the electrolyte may be accelerated as the amount of the transition metal eluted under high voltage conditions increases.

In order to solve the above-described defects, a method of adding an additive such as succinonitrile in the non-aqueous electrolyte has been suggested. In this case, the swelling phenomenon of the battery may be improved to some, however, the charge/discharge cycle lifetime of the battery may be decreased (Patent Literature 1).

Thus, there is a need to develop a technique for improving the safety of lithium secondary battery.

PRIOR ART

Patent Literature

Patent literature 1: Korean Registered Patent No. 10-1050333.

SUMMARY OF THE INVENTION

An object of the present invention is to provide a lithium secondary battery capable of preventing the swelling phenomenon of the battery due to generated gas during storing at a high temperature and having improved charge/discharge performance and cycle lifetime after storing at the high temperature for a long time.

There is provided in the present invention a lithium secondary battery comprising a positive electrode, a negative electrode, a separator inserted between the positive electrode and the negative electrode and a non-aqueous electrolyte.

The positive electrode comprises a first positive electrode active material represented by the following Chemical Formula 1, and the non-aqueous electrolyte comprises a first lithium salt, a second lithium salt represented by the following Chemical Formula 2 and a non-aqueous organic solvent.

$$Li_xM_yO_z \quad \text{[Chemical Formula 1]}$$

$$Li^+RCOO^- \quad \text{[Chemical Formula 2]}$$

(In Chemical Formulae 1 and 2, M=$Ni_aMn_bCo_c$, in which $0<a<2$, $0<b<2$, $0<c<2$, $a+b+c=1$ or $2$, $0.5 \leq x \leq 1.3$, $1<x+y \leq 3.3$, $2 \leq z \leq 4$, and R is independently a $C_1$-$C_{10}$ alkyl group, a $C_6$-$C_{12}$ aryl group, a $C_2$-$C_5$ alkenyl group, a halogen substituted $C_1$-$C_{10}$ alkyl group, a halogen substituted $C_6$-$C_{12}$ aryl group or a halogen substituted $C_2$-$C_5$ alkenyl group.)

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE PREFERRED EMBODIMENT

Figure 1:
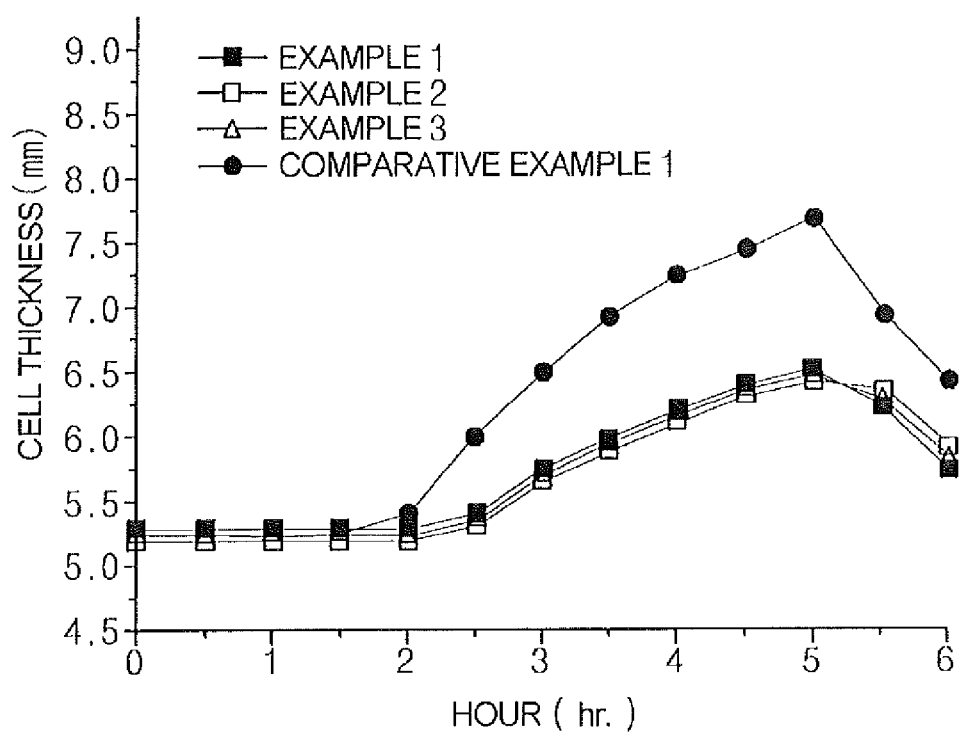
FIG. 1 is a graph illustrating a cell thickness change with respect to the storing time of batteries manufactured according to example embodiments of the present invention and a comparative example.

There is provided in the present invention a lithium secondary battery comprising a positive electrode, a negative electrode, a separator inserted between the positive electrode and the negative electrode and a non-aqueous electrolyte.

The positive electrode comprises a first positive electrode active material represented by the following Chemical Formula 1, and the non-aqueous electrolyte comprises a first lithium salt, a second lithium salt represented by the following Chemical Formula 2 and a non-aqueous organic solvent.

$$Li_xM_yO_z \quad \text{[Chemical Formula 1]}$$

$$Li^+RCOO^- \quad \text{[Chemical Formula 2]}$$

(In Chemical Formulae 1 and 2, $M=Ni_aMn_bCo_c$, in which $0<a<2$, $0<b<2$, $0<c<2$, $a+b+c=1$ or 2, $0.5 \leq x \leq 1.3$, $1<x+y \leq 3.3$, $2 \leq z \leq 4$, and R is independently a $C_1$-$C_{10}$ alkyl group, a $C_6$-$C_{12}$ aryl group, a $C_2$-$C_5$ alkenyl group, a halogen substituted $C_1$-$C_{10}$ alkyl group, a halogen substituted $C_6$-$C_{12}$ aryl group or a halogen substituted $C_2$-$C_5$ alkenyl group.)

In the lithium secondary battery of the present invention, The first positive electrode active material may be an active material of a three component system represented by $Li_{1+x}(Ni_aMn_bCo_{1-a-b-x})O_2$ ($-0.1 \leq x \leq 0.1$, $0 \leq a \leq 1$, $0 \leq x+a+b \leq 1$) or $Li_{1+x}(Mn_{2-x-y}Co_y)O_4$ ($-0.1 \leq x \leq 0.1$, $0 \leq y \leq 2$).

A cut diameter ($D_{50}$) of the first positive electrode active material may be less than or equal to 8 μm and particularly may be 4 to 7 μm, and the particle type of the first positive electrode active material may have an agglomerated structure of minute particles. Particularly, the first positive electrode active material may have an agglomerated structure of 90% or more of minute particles having a size of 1 to 4 μm.

In the secondary battery of the present invention, the positive electrode may further comprise a second positive electrode active material represented by the following Chemical Formula 3a or 3b.

$$Li_xM^1_yO_z \qquad \text{[Chemical Formula 3a]}$$

(In Chemical Formula 3a, $M^1$ is Co, Ni or Mn, in which $0.5 \leq x \leq 1.3$, $1<x+y \leq 3$, and $2 \leq z \leq 4$.)

$$Li_xM^2_yO_z \qquad \text{[Chemical Formula 3b]}$$

(In Chemical Formula 3b, $M^2=Ni_aMn_bCo_c$, in which $0 \leq a \leq 2$, $0 \leq b \leq 2$, $0 \leq c \leq 2$, $a+b+c=1$ or 2, $0.5 \leq x \leq 1.3$, $1<x+y \leq 3$, and $2 \leq z \leq 4$.)

Examples on the second positive electrode active material may comprise $Li_xCo_2O_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_xNi_{1-r}Co_rO_2$ ($0.5<x<1.3$, $0<r<1$), $Li_xCo_{1-r}Mn_rO_2$ ($0.5<x<1.3$, $0<r<1$), $Li_xNi_{1-r}Mn_rO_2$ ($0.5<x<1.3$, $0<r<1$), $Li_xMn_{2-p}Ni_pO_4$ ($0.5<x<1.3$, $0<p<2$) and $Li_xMn_{2-p}Co_pO_4$ ($0.5<x<1.3$, $0<p<2$).

The cut diameter ($D_{50}$) of the second positive electrode active material may be greater than or equal to 15 μm and particularly may be 20 to 30 μm, and the second positive electrode active material may comprise monolithic phase particles.

A relative weight ratio of the first positive electrode active material:the second positive electrode active material may be 10:90 to 50:50 and particularly may be 50:50 to 30:70. When the amount ratio of the first positive electrode active material is less than 10, the amount of the other metal component Co constituting the three component system may be increased, and cost reduction effect may be decreased. When the amount ratio of the first positive electrode active material exceeds 50, a gas may be generated when stored at a high temperature.

The surfaces of the first positive electrode active material and the second positive electrode active material may be coated with a metal such as aluminum (Al) or a metal oxide by known methods.

Meanwhile, in a mixed transition metal oxide layer (MO layer) in the first positive electrode active material, $Ni^{2+}$ and $Ni^{3+}$ coexist, and a portion of the $Ni^{2+}$ may be inserted in an absorbing and desorbing layer (reversible lithium layer). Since the $Ni^{2+}$ has a very similar size as the lithium ion ($Li^+$), the inserted $Ni^{2+}$ in the reversible lithium layer may not transform a crystalline structure while preventing the breaking of the crystalline structure due to the repulsive force of the transition metal oxide layer (MO layer) after the desorbing of the lithium ions during charging. Thus, an appropriate amount of the $Ni^{2+}$ is preferably comprised so as to support a gap between the MO layers stably. In addition, in order to prevent velocity property deterioration, an appropriate amount of the $Ni^{2+}$ is preferably comprised so as not to inhibit the reversible absorbing and desorbing of the lithium ions at the lithium layer. That is, when the molar fraction of the inserted $Ni^{2+}$ in the reversible lithium layer is too high, the insertion of the $Ni^{2+}$ may be increased to inhibit the charging and the discharging and to decrease a discharge capacity. Thus, the molar fraction of the $Ni^{2+}$ inserted in the reversible lithium layer is 0.03 to 0.07 based on the total amount of Ni. When the molar fraction of the $Ni^{2+}$ exceeds 0.07, the initial capacity of the battery may be decreased.

In addition, in the secondary battery of the present invention, the positive electrode may further comprise a third positive electrode active material represented by the following Chemical Formula 4.

$$LiNi_oM^3_pO_2 \qquad \text{[Chemical Formula 4]}$$

(In Chemical Formula 4, $M^3$ is Co or Fe, and $0.7 \leq o \leq 0.8$, $0.2<P<0.3$)

In addition, the lithium secondary battery may additionally comprise a sulfide, a selenide, a halide, and the like as the positive electrode active material of the secondary battery of the present invention besides the lithium-containing transition metal oxide such as the first to third positive electrode active materials.

In addition, in the secondary battery of the present invention, the first lithium salt comprised in the non-aqueous electrolyte may comprise lithium salts commonly used in an electrolyte of a common lithium secondary battery without limitation, for example, $Li^+$ cation and at least one anion selected from the group consisting of $F^-$, $Cl^-$, $Br^-$, $I^-$, $NO_3^-$, $N(CN)_2^-$, $BF_4^-$, $F_2BO_4^-$, $B(O_4)_2^-$, $ClO_4^-$, $PF_6^-$, $(CH_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FO_2)_2N^-$, $CF_3CF_2(CF_3)_2CO^-$, $(CF_3SO_2)_2CH^-$, $(SF_6)_3C^-$, $(CF_3SO_2)_3C^-$, $CF_3(CF_2)_7SO_3^-$, $SCN^-$ and $(CF_3CF_2SO_2)_2N^-$.

The first lithium salt may be comprised in the non-aqueous electrolyte by about 10 wt %.

In addition, the second lithium salt may comprise lithium acetate, lithium trifluoroacetate ($LiCF_3COO$), lithium octanoate or a mixture thereof.

The amount of the second lithium salt may be 0.01 to 2.0 wt %, particularly may be 0.05 to 0.5 wt %, based on the total amount of the non-aqueous electrolyte. When the amount of the second lithium salt is less than 0.01 wt %, the swelling restraining effect of the battery at a high temperature may be insufficient. When the amount exceeds 2.0 wt %, the conductivity of an electrolyte may be largely decreased due to the second lithium salt having a relatively small dissociation degree. At the same time, the initial capacity of the battery may be decreased due to the formation of a thick coating layer on the positive electrode by $RCOO^-$ anion.

In the lithium secondary battery according to the present invention, the non-aqueous organic solvent comprised in the non-aqueous electrolyte may comprise any organic solvents commonly used as the electrolyte for a lithium secondary battery without limitation, and may typically comprise an ether compound, an ester compound, a linear carbonate compound, a cyclic carbonate compound, an amide compound and the like.

Particularly, the ether compound may comprise at least one compound selected from the group consisting of dimethyl ether, diethyl ether, dipropyl ether, methyl ethyl ether, methyl propyl ether, and ethyl propyl ether.

The ester compound may comprise at least one compound selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone.

In addition, the linear carbonate compound may comprise at least one compound selected from the group consisting of diethyl carbonate, dimethyl carbonate, ethyl methyl carbonate, methyl propyl carbonate, and dipropyl carbonate.

And the cyclic carbonate compound may comprise at least one compound selected from the group consisting of propylene carbonate, ethylene carbonate, 1,2-butylene carbonate, 2,3-butylene carbonate, 1,2-pentylene carbonate, 2,3-pentylene carbonate, vinylene carbonate and a halogenated compound thereof.

Particularly, the organic solvent used in the electrolyte for the lithium secondary battery of the present invention may comprise the linear carbonate and the cyclic carbonate, or a mixture thereof. More particularly, the organic solvent used in the electrolyte for the lithium secondary battery of the present invention, may comprise the cyclic carbonate such as ethylene carbonate and propylene carbonate, which has a high viscosity and a high dielectric constant and dissociates the lithium salt in the electrolyte very well, or may comprise both the cyclic carbonate and the linear carbonate such as dimethyl carbonate and diethyl carbonate, which has a low viscosity and a low dielectric constant at an appropriate mixing ratio to prepare an electrolyte having a high electric conductivity.

The non-aqueous organic solvent may further comprise at least one compound selected from the group consisting of vinylene carbonate, dimethyl sulfoxide, acetonitrile, dimethoxyethane, diethoxyethane, sulfolane, propylene sulfite and tetrahydrofuran.

In addition, the non-aqueous electrolyte of the present invention may further comprise an additive capable of forming a passivation layer on the surface of the negative electrode. Examples of the additive may comprise a carbonate compound such as fluoroethylene carbonate, vinylethylene carbonate, and the like; a sulfur (S)-based compound such as propane sultone, ethylene sulfite, and 1,3-propane sultone; or a lactam compound such as N-acetyl lactam.

The organic solvent used in a non-aqueous electrolyte of a common lithium secondary battery may be oxidized and decomposed at the surface of a positive electrode through the repetition of charging and discharging. Particularly, when a lithium transition metal oxide is used as the positive electrode active material, the oxidation and decomposition reaction of the organic solvent by the transition metal at a high temperature may be accelerated. In this case, the transform of the battery and the ignition or explosion of the battery may be induced.

By additionally comprising a second lithium salt capable of easily forming a complex at the surface of the positive electrode comprising lithium-transition metal oxide in the non-aqueous electrolyte, the transform and the explosion of the battery while storing at a high temperature may be prevented. Particularly, the anion of the second lithium salt of the present invention, $RCOO^-$ illustrates a bonding energy with the transition metal component of the positive electrode active material (Mn, Ni, Co) of four times or over in the non-aqueous electrolyte having a dielectricity ($\in$) of about 20 to 30 when compared with the first lithium salt $Li^+PF_6^-$ (see Table 1). Thus, the non-aqueous electrolyte comprising the second lithium salt of the present invention may form a complex at the surface of the positive electrode comprising the lithium transition metal oxide more easily than the non-aqueous electrolyte comprising the first lithium salt alone. Accordingly, the transition metal comprised in the positive electrode active material may be deactivated, and the oxidation reaction of the electrolyte may be prevented. As the result, the generation of a gas in a battery while storing at a high temperature may be prevented, and the inner short or the explosion of the battery due to the deformation of the battery (the swelling phenomenon of the battery) may be improved.

Meanwhile, the negative electrode comprising the negative electrode active material and the separator constituting the lithium secondary battery of the present invention may employ commonly used ones for the manufacture of the lithium secondary battery.

Particularly, the negative electrode active material may comprise a carbon material, a lithium metal, silicon, tin or a metal oxide, which may commonly conduct the absorbing and the desorbing of lithium ions, and may also comprise a metal oxide such as $TiO_2$, $SnO_2$, etc. having a potential of 2V or less with respect to lithium. In this case, the carbon material may comprise at least one carbon having a low crystallinity selected from soft carbon and hard carbon, or at least one carbon having a high crystallinity selected from the group consisting of natural graphite, kish graphite, pyrolytic carbon, a mesophase pitch based carbon fiber, meso-carbon microbeads, mesophase pitches and petroleum or coal tar pitch derived cokes.

In addition, the positive electrode and the negative electrode may further use a binder polymer. Typical examples of the binder polymer comprise at least one selected from the group consisting of a vinylidene fluoride-hexafluoropropylene copolymer (PVDF-co-HFP), polyvinylidene fluoride, polyacrylonitrile, and polymethyl methacrylate.

In addition, in the lithium secondary battery according to the present invention, the separator may be formed by a commonly used porous polymer film as the separator, for example, a porous polymer film manufactured by using a polyolefin polymer selected from the group consisting of ethylene homopolymer, propylene homopolymer, ethylene/butene copolymer, ethylene/hexene copolymer and ethylene/methacrylate copolymer, alone or a laminated type; or by using a porous non-woven fabric formed by using a high melting point glass fiber and a polyethylene terephthalate fiber, without limitation.

The external shape of the lithium secondary battery according to the present invention is not limited to any shapes and may comprise a cylindrical shape using a can, a polygonal shape, a pouch shape or a coin shape.

According to example embodiments, a lithium secondary battery comprises a positive electrode comprising a positive electrode active material of a three component system and a non-aqueous electrolyte comprising an additive capable of deactivating a transition metal, thereby providing a swelling restraining phenomenon and an improved cycle lifetime.

EXAMPLE

Reference will now be made in detail to the preferred embodiments of the present invention. Although the preferred embodiments of the present invention have been disclosed for illustrative purpose, those skilled in the art will appreciate that various modifications, additions and substitutions can be made without departing from the scope and spirit of the invention as defined in the accompanying claims.

Examples

I. Method of Manufacturing Battery

Example 1

(1) Preparation of Non-Aqueous Electrolyte

Under an Ar atmosphere, into 100 g of a 0.8M first lithium salt ($LiPF_6$) electrolyte having a composition of ethylene carbonate:propylene carbonate:diethyl carbonate (3:2:5 by weight), 1 g of vinylene carbonate (VC), 1 g of vinyl ethylene carbonate (VEC), 2.0 g of fluoroethylene carbonate (FEC) and 0.1 g of lithium trifluoroacetate as a second lithium salt, were added to prepare a non-aqueous electrolyte (1) according to the present invention.

(2) Manufacture of Electrode

A positive electrode active material slurry was prepared by mixing $LiNi_{0.50}CO_{0.2}Mn_{0.27}O_2$ ($D_{50}$ is 5 to 8 µm), which is an agglomerated body of minute particles of 1 to 2 µm, as a first positive electrode active material, and $LiCoO_2$ ($D_{50}$ is 15 to 20 µm) having a monolithic phase structure, as a second positive electrode active material, by the weight ratio of 30:70. The obtained slurry was coated on an aluminum plate, dried and rolled to manufacture a positive electrode.

In addition, a natural graphite, a styrene-butadiene rubber as a binder and carboxymethyl cellulose as a viscosity increasing agent were mixed by the weight ratio of 96:2:2 and dispersed in water to prepare a negative electrode slurry. The obtained slurry was coated on a copper foil having a thickness of 10 µm, dried and rolled to manufacture a negative electrode.

(3) Manufacture of Battery

A polymer battery was manufactured by using the thus manufactured positive electrode, and the negative electrode along with a porous separator by means of a common method. Then, the non-aqueous electrolyte of step (1) was injected to manufacture a battery according to the present invention.

Example 2

(1) Preparation of Non-Aqueous Electrolyte

Under an Ar atmosphere, into 100 g of a 0.8M first lithium salt ($LiPF_6$) electrolyte having a composition of ethylene carbonate:propylene carbonate:diethyl carbonate (3:2:5 by weight), 1 g of vinylene carbonate (VC), 1 g of vinyl ethylene carbonate (VEC), 2 g of fluoroethylene carbonate (FEC) and 0.5 g of lithium octanoate as a second lithium salt, were added to prepare a non-aqueous electrolyte (2) according to the present invention.

(2) Manufacture of Electrode

A positive electrode active material slurry was prepared by mixing $LiNi_{0.53}CO_{0.2}Mn_{0.27}O_2$ ($D_{50}$ is 5 to 8 µm), which is an agglomerated body of minute particles of 1 to 2 µm, as a first positive electrode active material, and $LiCoO_2$ ($D_{50}$ is 15 to 20 µm) having a monolithic phase structure, as a second positive electrode active material, by the weight ratio of 30:70. The obtained slurry was coated on an aluminum plate, dried and rolled to manufacture a positive electrode.

In addition, a natural graphite, a styrene-butadiene rubber as a binder and carboxymethyl cellulose as a viscosity increasing agent were mixed by the weight ratio of 96:2:2 and dispersed in water to prepare a negative electrode slurry. The obtained slurry was coated on a copper foil having a thickness of 10 µm, dried and rolled to manufacture a negative electrode.

(3) Manufacture of Battery

A polymer battery was manufactured by using the thus manufactured positive electrode, and the negative electrode along with a porous separator by means of a common method. Then, the non-aqueous electrolyte of step (1) was injected to manufacture a battery according to the present invention.

Example 3

(1) Preparation of Non-Aqueous Electrolyte

Under an Ar atmosphere, into 100 g of a 0.8M first lithium salt ($LiPF_6$) electrolyte having a composition of ethylene carbonate:propylene carbonate:diethyl carbonate (3:2:5 by weight), 1 g of vinylene carbonate (VC), 1 g of vinyl ethylene carbonate (VEC), 2.0 g of fluoroethylene carbonate (FEC) and 0.1 g of lithium trifluoroacetate as a second lithium salt, were added to prepare a non-aqueous electrolyte (1) according to the present invention.

(2) Manufacture of Electrode

A positive electrode active material slurry was prepared by mixing $LiNi_{0.50}CO_{0.2}Mn_{0.27}O_2$ ($D_{50}$ is 5 to 8 µm), which is an agglomerated body of minute particles of 1 to 2 µm, as a first positive electrode active material, $LiCoO_2$ ($D_{50}$ is 15 to 20 µm) having a monolithic phase structure, as a second positive electrode active material, and $LiNi_{0.8}CO_{0.15}Al_{0.05}O_2$ ($D_{50}$ is 10 to 15 µm) as a third positive electrode active material, by the weight ratio of 30:50:20. The obtained slurry was coated on an aluminum plate, dried and rolled to manufacture a positive electrode.

In addition, a natural graphite, a styrene-butadiene rubber as a binder and carboxymethyl cellulose as a viscosity increasing agent were mixed by the weight ratio of 96:2:2 and dispersed in water to prepare a negative electrode slurry. The obtained slurry was coated on a copper foil having a thickness of 10 µm, dried and rolled to manufacture a negative electrode.

(3) Manufacture of Battery

A polymer battery was manufactured by using the thus manufactured positive electrode, and the negative electrode along with a porous separator by means of a common method. Then, the non-aqueous electrolyte of step (1) was injected to manufacture a battery according to the present invention.

Comparative Example 1

(1) Preparation of Non-Aqueous Electrolyte

Under an Ar atmosphere, into 100 g of a 0.8M first lithium salt ($LiPF_6$) electrolyte having a composition of ethylene carbonate:propylene carbonate:diethyl carbonate (3:2:5 by weight), 1 g of vinylene carbonate (VC), 1 g of vinyl ethylene carbonate (VEC), and 2 g of fluoroethylene carbonate (FEC) were added to prepare a non-aqueous electrolyte.

(2) Manufacture of Electrode

A positive electrode active material slurry was prepared by mixing $LiNi_{0.50}Co_{0.2}Mn_{0.27}O_2$ ($D_{50}$ is 5 to 8 μm), which is an agglomerated body of minute particles of 1 to 2 μm, as a first positive electrode active material, and $LiCoO_2$ ($D_{50}$ is 15 to 20 μm) having a monolithic phase structure, as a second positive electrode active material, by the weight ratio of 30:70. The thus obtained slurry was coated on an aluminum plate, dried and rolled to manufacture a positive electrode.

In addition, a natural graphite, a styrene-butadiene rubber as a binder and carboxymethyl cellulose as a viscosity increasing agent were mixed by the weight ratio of 96:2:2 and dispersed in water to prepare a negative electrode slurry. The obtained slurry was coated on a copper foil having a thickness of 10 μm, dried and rolled to manufacture a negative electrode.

(3) Manufacture of Battery

A polymer battery was manufactured by using the thus manufactured positive electrode, and the negative electrode along with a porous separator by means of a common method. Then, the non-aqueous electrolyte was injected to manufacture a battery.

II. Method of Evaluating Battery Performance

Experiment 1. Measuring Bonding Energy (eV) of Metal and Lithium Salt

Bonding energy between each metal constituting a three component system with first and second lithium salts was obtained by Quantum chemical calculation at an electrolyte dielectricity of $\in=30$, is illustrated in the following Table 1.

TABLE 1

| Metal<br>Lithium salt | Mn | Co | Ni |
|---|---|---|---|
| $Li^+$ $\overset{O}{\underset{\text{-}O}{\diagup}}\diagdown$ | — | 5.82 | 6.20 |
| $Li^+$ $\overset{O}{\underset{\text{-}O}{\diagup}}$—$C_7H_{15}$ | — | 5.78 | 6.17 |
| $Li^+$ $\overset{O}{\underset{\text{-}O}{\diagup}}$—$CF_3$ | 3.45 | 4.73 | 5.00 |
| $Li^+PF_6^-$ | 1.75 | 1.43 | 1.91 |

As illustrated in Table 1, the anion, $RCOO^-$ of the second lithium salt has a greater bonding energy with respect to the transition metal components of the positive electrode active material, Mn, Ni, and Co, by four times when compared with the anion, $PF_6^-$ of the first lithium salt.

Experiment 2. Evaluation on Swelling Degree of Battery at High Temperature and High Voltage The thickness change (the swelling degree of battery) with respect to time was measured for the batteries manufactured according to Examples 1 to 3 and Comparative Example 1 under a high temperature and high voltage condition as follows.

Particularly, the test was conducted as follows. Each of the batteries was charged by 4.20 V, heated to 90° C. at a temperature increasing rate of 1° C./min, stored at 90° C. for four hours, and cooled to room temperature for 1 hour. In the test, the swelling degree of the battery was illustrated by a maximum thickness change (ΔT) with respect to an initial thickness (see the following Table 2 and FIG. 1).

TABLE 2

| | Amount of second lithium salt (wt %) | Thickness change (ΔT/mm) |
|---|---|---|
| Example 1 | 0.1 | 0.249 |
| Example 2 | 0.5 | 0.239 |
| Example 3 | 0.1 | 0.241 |
| Comparative Example 1 | 0 | 2.448 |

As illustrated in Table 2, the batteries comprising the electrolyte comprising the second lithium salt according to Examples 1 to 3 were confirmed to illustrate not much thickness change (that is, the swelling degree of battery) even though stored at a high temperature for a long time when compared with the battery of Comparative Example 1.

Experiment 3. Measuring Charge/Discharge Cycle Lifetime at High Temperature

Figure 2:
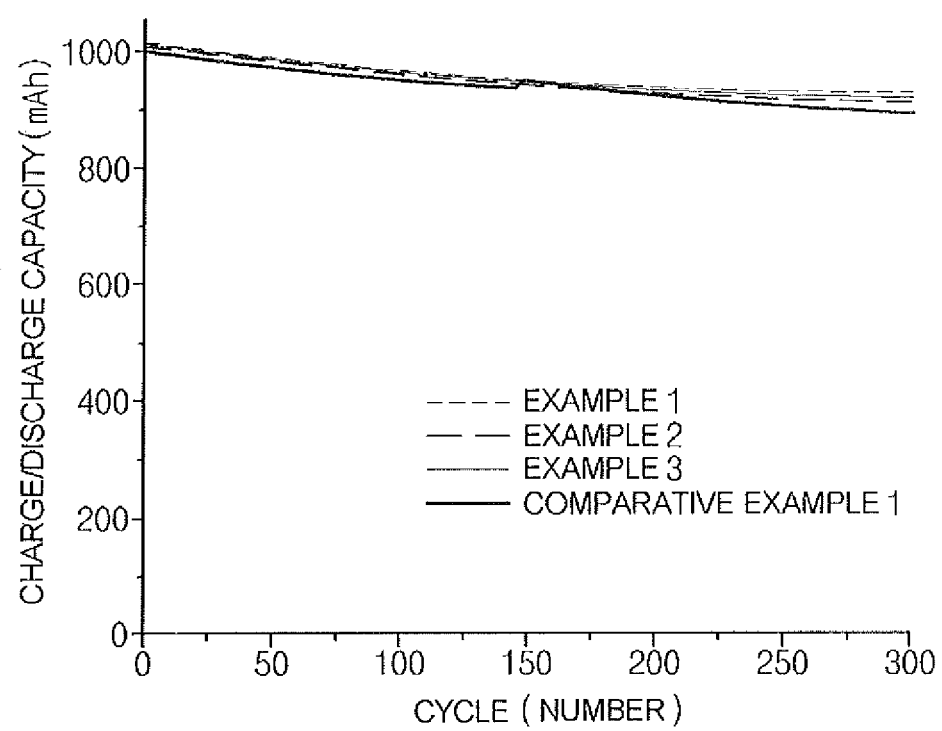
FIG. 2 is a graph illustrating charge/discharge capacity with respect to charge/discharge cycle of batteries manufactured according to an example embodiment of the present and a comparative example.

The charge/discharge cycle lifetimes of the batteries manufactured according to Examples 1 to 3 and Comparative Example 1 were measured at 45° C. with a voltage range of 3.0 to 4.2 V. The charge/discharge capacity maintaining ratios with respect to an initial capacity are illustrated in the following Table 3 and FIG. 2.

TABLE 3

| | Capacity maintaining ratio (%) | Cycle number |
|---|---|---|
| Example 1 | 90.9 | 300 |
| Example 2 | 89.8 | 300 |
| Example 3 | 90.1 | 300 |
| Comparative Example 1 | 88.7 | 300 |

As illustrated in Table 3, the battery comprising the electrolyte comprising the second lithium salt according to the present invention has an improving effect of charge/discharge lifetime (capacity maintaining ratio) at a high temperature.

The invention claimed is:

1. A lithium secondary battery comprising a positive electrode, a negative electrode, a separator inserted between the positive electrode and the negative electrode, and a non-aqueous electrolyte solution,
    wherein the positive electrode comprises a first positive electrode active material represented by following Chemical Formula 1, and
    wherein the non-aqueous electrolyte solution comprises a first lithium salt, a second lithium salt, and a non-aqueous organic solvent,
    wherein the second lithium salt is lithium acetate, lithium trifluoroacetate ($LiCF_3COO$), lithium octanoate or a mixture thereof, and
    wherein the amount of the second lithium salt is 0.01 wt % to 2.0 wt % based on a total amount of the non-aqueous electrolyte;

$Li_xM_yO_z$       [Chemical Formula 1]

wherein $M_y=Ni_aMn_bCo$, $0<a<2$, $0<b<2$, $0<c<2$, $a+b+c=1$ or 2, $0.5\leq x\leq 1.3$, $1<x+y\leq 3.3$, $2\leq z\leq 4$.

2. The lithium secondary battery of claim 1, wherein the first positive electrode active material is represented by $Li_{1+x}(Ni_aMn_bCo_{1-a-b-x})O_2$ ($-0.1\leq x\leq 0.1$, $0\leq a\leq 1$, $0\leq x+a+b\leq 1$) or $Li_{1+x}(Mn_{2-x-y}Co_y)O_4$ ($-0.1\leq x\leq 0.1$, $0\leq y\leq 2$).

3. The lithium secondary battery of claim 1, wherein a cut diameter ($D_{50}$) of the first positive electrode active material is less than or equal to 8 μm, and the first positive electrode active material has an agglomerated structure of minute particles.

4. The lithium secondary battery of claim 3, wherein the cut diameter ($D_{50}$) of the first positive electrode active material is 4 μm to 7 μm.

5. The lithium secondary battery of claim 1, wherein the positive electrode further comprises a second positive electrode active material represented by following Chemical Formula 3a or 3b, $$Li_xM^1_yO_z \quad \text{[Chemical Formula 3a]}$$

in Chemical Formula 3a, $M^1$ is Co, Ni or Mn, in which $0.5\leq x\leq 1.3$, $1<x+y\leq 3$, and $2\leq z\leq 4$)

$$Li_xM^2_yO_z \quad \text{[Chemical Formula 3b]}$$

in Chemical Formula 3b, $M^2_y=Ni_aMn_bCo_a$, in which $0\leq a\leq 2$, $0\leq b\leq 2$, $0\leq c\leq 2$, $a+b+c=1$ or 2, $0.5\leq x\leq 1.3$, $1<x+y\leq 3$, and $2\leq z\leq 4$.

6. The lithium secondary battery of claim 5, wherein the second positive electrode active material is selected from the group consisting of $Li_xCOO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_xNi_{1-r}Co_rO_2$ ($0.5<x<1.3$, $0<r<1$), $Li_xCo_{1-r}Mn_rO_2$ ($0.5<x<1.3$, $0<r<1$), $Li_xNi_{1-r}Mn_rO_2$ ($0.5<x<1.3$, $0<r<1$), $Li_xMn_{2-p}Ni_pO_4$ ($0.5<x<1.3$, $0<p<2$) and $Li_xMn_{2-p}Co_pO_4$ ($0.5<x<1.3$, $0<p<2$).

7. The lithium secondary battery of claim 5, wherein the cut diameter ($D_{50}$) of the second positive electrode active material is greater than or equal to 15 μm, and the second positive electrode active material comprises monolithic phase particles.

8. The lithium secondary battery of claim 7, wherein the cut diameter ($D_{50}$) of the second positive electrode active material is 20 to 30 μm.

9. The lithium secondary battery of claim 1, wherein a relative weight ratio of the first positive electrode active material:the second positive electrode active material is 10:90 to 50:50.

10. The lithium secondary battery of claim 1, wherein surfaces of the first positive electrode active material and the second positive electrode active material are coated with a metal or a metal oxide.

11. The lithium secondary battery of claim 1, wherein the positive electrode further comprises a third positive electrode active material represented by following Chemical Formula 4, $$LiNi_oM^3_pO_2 \quad \text{[Chemical Formula 4]}$$

in Chemical Formula 4, $M^3$ is Co or Fe, and $0.7\leq o\leq 0.8$, $0.2<P<0.3$.

12. The lithium secondary battery of claim 1, wherein the first lithium salt comprises $Li^+$ cation and at least one anion selected from the group consisting of $F^-$, $Cl^-$, $Br^-$, $I^-$, $NO_3^-$, $N(CN)_2^-$, $BF_4^-$, $F_2BO_4^-$, $B(O_4)_2^-$, $ClO_4^-$, $PF_6^-$, $(CH_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FO_2)_2N^-$, $CF_3CF_2(CF_3)_2CO^-$, $(CF_3SO_2)_2CH^-$, $(SF_6)_3C^-$, $(CF_3SO_2)_3C^-$, $CF_3(CF_2)_7SO_3^-$, $SCN^-$ and $(CF_3CF_2SO_2)_2N^-$.

13. The lithium secondary battery of claim 1, wherein the amount of the second lithium salt is 0.05 to 0.5 wt % based on the total amount of the non-aqueous electrolyte.

14. The lithium secondary battery of claim 1, wherein the non-aqueous organic solvent comprises at least one organic solvent selected from the group consisting of an ether compound, an ester compound, a linear carbonate compound, a cyclic carbonate compound and an amide compound.

15. The lithium secondary battery of claim 14, wherein the non-aqueous organic solvent further comprises at least one compound selected from the group consisting of dimethyl sulfoxide, acetonitrile, dimethoxyethane, diethoxyethane, sulfolane, propylene sulfite and tetrahydrofuran.

16. The lithium secondary battery of claim 1, wherein the non-aqueous electrolyte solution further comprises at least one additive selected from the group consisting of vinylene carbonate, fluoroethylene carbonate, vinylethylene carbonate, propane sultone, ethylene sulfite, 1,3-propane sultone and N-acetyl lactam.

17. The lithium secondary battery of claim 1, wherein the negative electrode comprises at least one negative electrode active material selected from the group consisting of a carbon material, a lithium metal, silicon, tin and a metal oxide.

18. The lithium secondary battery of claim 1, wherein the positive electrode and the negative electrode further comprise at least one binder compound selected from the group consisting of a vinylidene fluoride-hexafluoropropylene copolymer, polyvinylidene fluoride, polyacrylonitrile, and polymethyl methacrylate.

19. The lithium secondary battery of claim 1, wherein the separator is formed by using a polyolefin polymer selected from the group consisting of ethylene homopolymer, propylene homopolymer, ethylene/butene copolymer, ethylene/hexene copolymer and ethylene/methacrylate copolymer; or by using a porous non-woven fabric selected from a high melting point glass fiber and a polyethylene terephthalate fiber.

20. The lithium secondary battery of claim 1, wherein the lithium secondary battery described in claim 1 has a cylindrical shape, a polygonal shape, a pouch shape or a coin shape.

21. The lithium secondary battery of claim 1, wherein the positive electrode further comprises a third positive electrode active material that is $LiNi_{0.8}CO_{0.15}Al_{0.05}O_2$.

* * * * *